Dec. 20, 1932.    C. C. MAY ET AL    1,891,565
FERTILIZER DISTRIBUTOR
Filed July 24, 1930

CHRISTOPHER C. MAY
AND VERNON H. WHITTEN  INVENTORS

BY Townshend & Townshend
ATTORNEY

Patented Dec. 20, 1932

1,891,565

UNITED STATES PATENT OFFICE

CHRISTOPHER C. MAY AND VERNON H. WHITTEN, OF BODCAW, ARKANSAS

FERTILIZER DISTRIBUTOR

Application filed July 24, 1930. Serial No. 470,513.

Our invention relates to apparatus for the distribution of fertilizer material and has as an important object the provision of an apparatus of this character which is designed to provide free feeding of lumpy fertilizer and which at the same time is provided with means for crushing the material to remove lumps which form therein as a common occurrence such as in the case of nitrate of soda and sulphate of ammonia.

Another object of the invention is the provision in an apparatus of this character of gear shift means for controlling the feed and distribution of material therefrom. Another object is the provision in an apparatus of this character of means adjustable for regulating the rate of feed of material.

With these and such other objects in view as will be apparent from the description, the invention resides in the novel combination, construction, and arrangement of parts hereinafter described and claimed and illustrated in the accompanying drawing wherein is shown a practical, physical embodiment of the principles of our invention.

Figure 1:
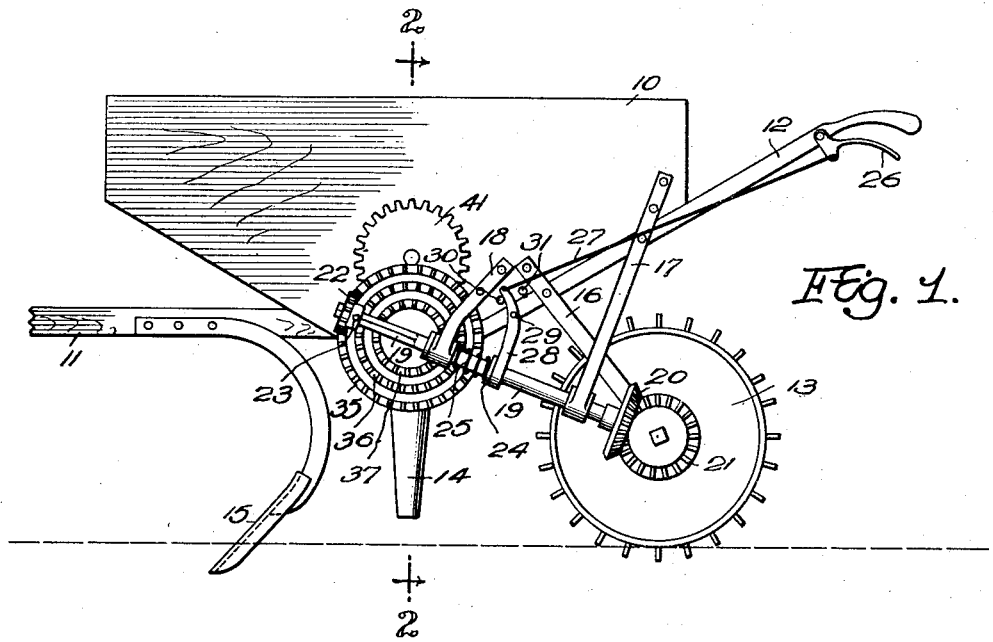
Figure 1 is an elevation of a distributor constructed in accordance with the invention.
Figures 2, 3:
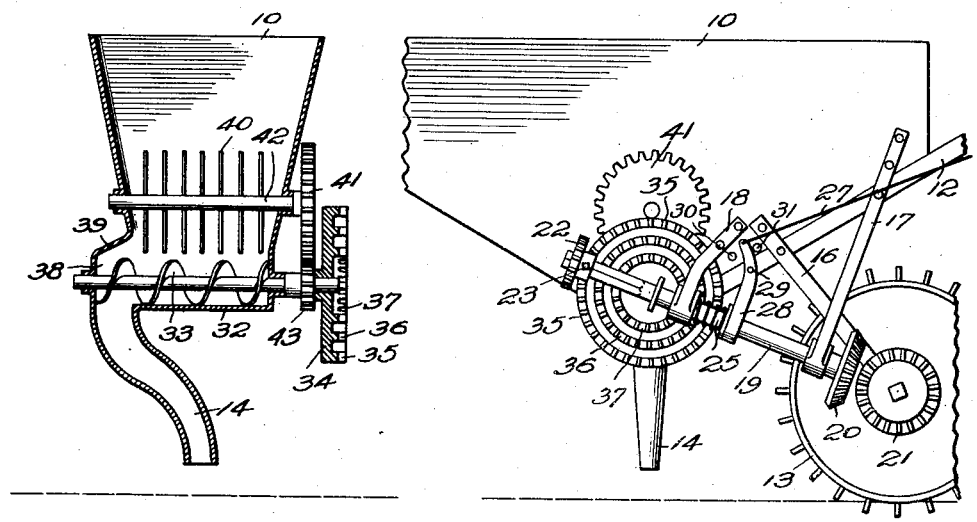
Figure 2 is a vertical section on the line 2—2 of Figure 1.
Figure 3 is a fragmentary elevation similar to Figure 1 but illustrating the operating gear as in disengaged position of the parts.

In accordance with accepted practice the invention comprises a hopper 10 in which the fertilizer material is placed and which hopper is mounted on a frame 11 having a rear handle bar construction as at 12 and which is supported by a toothed ground wheel 13. The frame may be of the hand barrow type or it may be arranged for draft operation as desired. Extending from the bottom of the hopper 10 is a discharge spout 14 which terminates a short distance above the surface of the ground over which the apparatus operates and which spout is disposed between the bearing wheel 13 and a harrow tooth 15 which is mounted forwardly in the frame to provide a furrow in which the fertilizer is disposed.

A bracket construction 16 extends rearwardly from the hopper 10 to provide the necessary bearing for the axle of the wheel 13 and disposed laterally from one side of the hopper is a pair of bearing straps 17 and 18 which are arranged in spaced relation having their lower ends formed as bearings to receive therethrough in slidable relation a shaft 19. The rear end of the shaft 19 carries a fixed driven pinion 20 which is adapted for meshing with an external gear 21 secured to the wheel 13 so as to rotate therewith. The forward end of the shaft 19 is squared or flattened to receive thereover in slidable relation a second driven pinion 22, which pinion is adjustable longitudinally of the shaft 19 by means of the set screw 23.

Intermediate its ends the shaft 19 is provided with an annular shoulder 24 which serves as an abutment for one end of an expansion spring 25 which is coiled around the shaft 19 and which abuts at its opposite end the bearing formed at the lower end of the strap 18, the normal expansion of the spring 25 acting to project the shaft 19 rearwardly so as to maintain the driven pinion 20 in mesh with the drive gear 21.

Mounted on the handle bar construction 12 is a gear shift control lever 26 which is pivoted so that when the lever is lifted by manual manipulation, it operates through the medium of a pull wire or rod 27 to rock a gear shift arm 28 on its pivot 29, which pivot is anchored in the main frame of the apparatus. Spaced stops 30 and 31 are provided on the side of the hopper in order to limit the rocking movement of the shift arm 28.

The hopper 10 is provided at its bottom with a reduced discharge trough 32 which extends transversely of the hopper beneath its bottom and within which is disposed an auger shaft 33, one end of which projects laterally beyond the side of the hopper and which has rigidly secured thereto at its outer extremity a burr gear 34 carrying three sets of concentrically spaced ring gears 35, 36 and 37 respectively on its outer face. The driven pinion 22 is adjustable over the shaft 19 by means of a set screw 23 so that it may be meshed with any of the respective ring gears to determine the speed of rotation of the auger member 33, as will be obvious.

The auger member 33 is a screw conveyor which in the present instance has an important function in serving as a means for crushing the lumped fertilizer material as it is fed from the hopper. At one side of the hopper the discharge trough 32 terminates in a discharge chamber 38 having a downwardly inclined top wall 39 arranged directly above the discharge spout 14, which spout is curved laterally inward beneath the hopper to deliver material directly in rear of the harrow tooth 15. Consequently the end of the auger 33 cooperates in the chamber 38 with the wall 39 to provide a crushing action which effectively breaks up the lumps which inevitably form in fertilizer materials as above described.

Arranged within the hopper above the member 33 is a rotary agitator 40 which receives its driving power from a gear 41 mounted on the external end of its shaft 42, which gear is constantly in mesh with a pinion 43 attached to the shaft of the conveyor 33 and rotatable therewith.

In the position of the parts as shown in Figure 1, the apparatus is operable to deliver fertilizer material at its lowest rate of speed, the driven pinion 22 being positioned on the shaft 19 for engagement with the outermost ring gear 35. It is obvious that under forward movement of the distributor the power drive imparted through the shaft 19 will cause a simultaneous rotary action of the screw conveyor or auger 33 and the agitator 40 within the hopper. This combined action loosens and delivers the material into the chamber 38 with in which all lumps of the fertilizer are crushed against the chamber walls dropping freely into the discharge spout 14 from whence the material is delivered to the ground surface in rear of the harrow tooth. When it is desired to discontinue delivery of material, the gear shift lever 26 is drawn up rocking the arm 28 on its pivot and moving the shaft 19 forwardly against compression of the spring 25 as the lower end of the arm 28 bears against the stop 24 with which the shaft 19 is provided. Under this movement of the shaft 19, both of the driven pinions 20 and 22 are disengaged. When the shift lever 26 is released the action of the spring 25 returns the parts to engaged position and the apparatus again operates to feed and distribute the material from the hopper.

While we have herein illustrated and described certain details entering into the construction and operation of the apparatus, we desire it to be understood that the same do not constitute limitations but that any desired changes may be made in the structural details as will fall within the scope of the invention as claimed.

We claim:

1. A fertilizer distributor comprising the combination with a portable hopper having inwardly inclined walls, of a discharge chamber at one side of the bottom of said hopper, a downwardly inclined top wall for said chamber, a screw conveyor for discharging material from the bottom of the hopper terminating in the discharge chamber adjacent the bottom of the inclined wall, and a discharge spout extending from the bottom of the chamber.

2. A fertilizer distributor comprising a supporting frame, a hopper mounted thereon, a discharge spout for the hopper, a handle extending rearwardly from said hopper, an axle supporting bracket extending rearwardly and downwardly from the hopper, an axle mounted thereon, a transverse conveyor for the hopper having one end extending therefrom, depending brackets on the hopper at the side adjacent the projecting conveyor end, a shaft slidably mounted in said brackets and having means for operatively connecting the axle and conveyor end, spring means for urging the shaft in one direction for said operative connection, a shift lever pivoted on the hopper adjacent the shaft supporting brackets, and means for operating said lever from the handle of the hopper to urge the shaft against the spring means to inoperative position.

In testimony whereof we affix our signatures.

CHRISTOPHER C. MAY.
VERNON H. WHITTEN.